Figure 1:
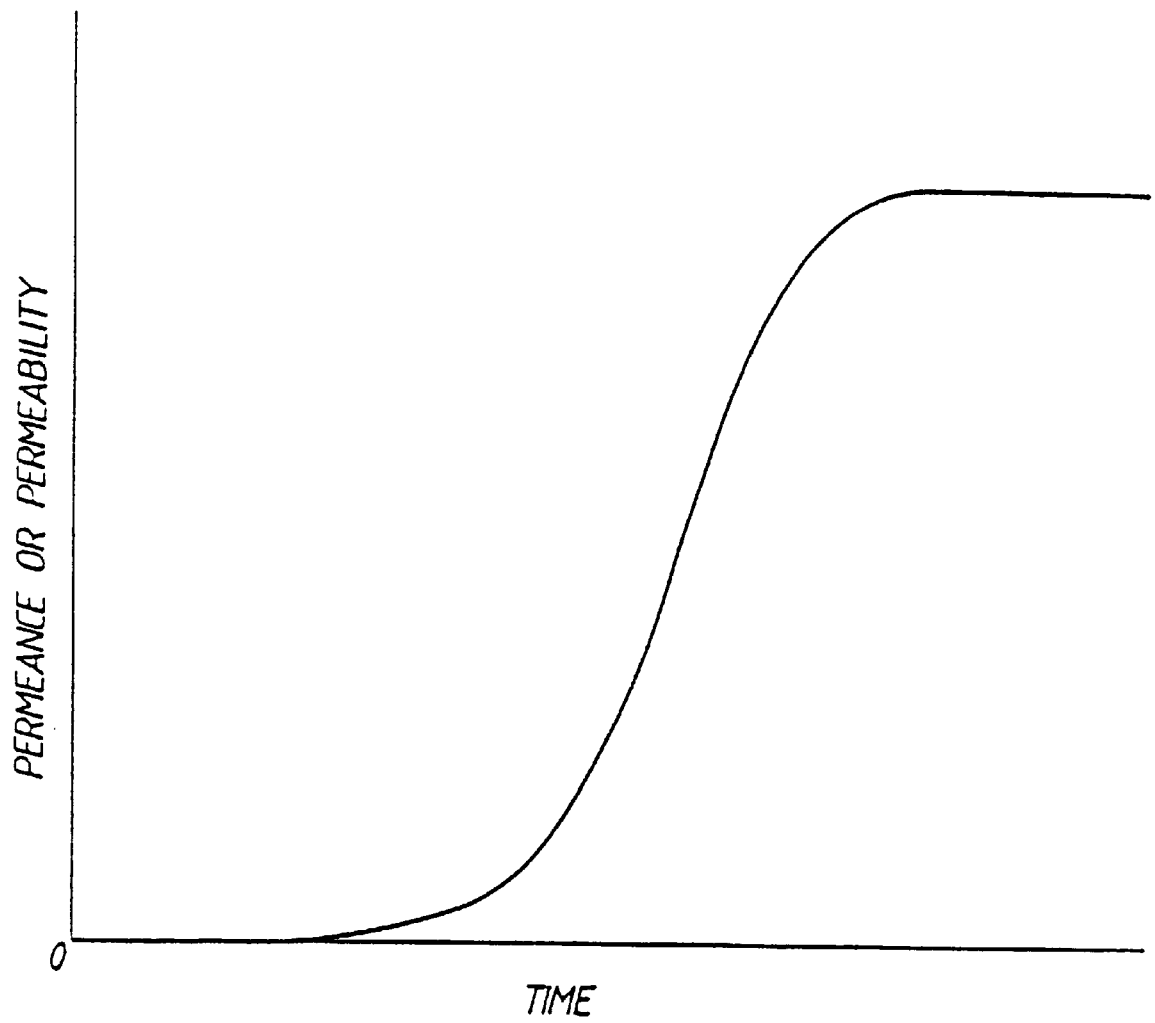

United States Patent [19]

Cochran et al.

[11] Patent Number: 5,955,527

[45] Date of Patent: *Sep. 21, 1999

[54] PACKAGING

[75] Inventors: Michael Alexander Cochran, Wantage; Rickworth Folland, Faringdon; James William Nicholas; Melvin Edward Riddell Robinson, both of Wantage, all of United Kingdom

[73] Assignee: CarnaudMetalbox plc, Wantage, United Kingdom

[ * ] Notice: This patent is subject to a terminal disclaimer.

[21] Appl. No.: 08/844,515

[22] Filed: Apr. 18, 1997

Related U.S. Application Data

[62] Division of application No. 08/472,841, Jun. 7, 1995, Pat. No. 5,639,815, which is a continuation of application No. 08/061,939, May 17, 1993, abandoned, which is a division of application No. 07/668,906, Mar. 13, 1991, abandoned, which is a division of application No. 07/340,416, Mar. 23, 1989, Pat. No. 5,021,515.

[30] Foreign Application Priority Data

| Jul. 27, 1987 | [GB] | United Kingdom | 8717754 |
|---|---|---|---|
| Mar. 12, 1988 | [GB] | United Kingdom | 8805931 |
| Mar. 22, 1988 | [GB] | United Kingdom | 8806752 |
| Jul. 1, 1988 | [GB] | United Kingdom | 8815699 |
| Jul. 6, 1988 | [WO] | WIPO | PCT/GB88/00532 |

[51] Int. Cl.$^6$ ............... C08K 3/17; C08K 5/00; B32B 27/36; B65D 81/24

[52] U.S. Cl. ............ 524/413; 252/188.28; 206/427; 524/413; 524/435; 525/371

[58] Field of Search ............. 252/188.28; 524/413, 524/435; 525/371; 206/427

[56] References Cited

U.S. PATENT DOCUMENTS

| 2,316,804 | 4/1943 | Musher | 220/64 |
|---|---|---|---|
| 3,260,689 | 7/1966 | Kibler | 524/398 |
| 3,454,510 | 7/1969 | Newland et al. | 523/126 |
| 3,458,462 | 7/1969 | Hostetler | 525/371 |
| 3,476,532 | 11/1969 | Hartman | 525/371 |
| 3,586,514 | 6/1971 | Vijibrief | 426/106 |
| 3,741,909 | 6/1973 | Yamane | 524/392 |
| 3,845,163 | 10/1974 | Murch | 260/857 |
| 3,856,750 | 12/1974 | Guillory | 524/392 |
| 3,890,281 | 6/1975 | Angstadt et al. | 525/371 |
| 3,928,268 | 12/1975 | Sato | 523/125 |
| 3,935,141 | 1/1976 | Potts et al. | 524/322 |
| 4,038,228 | 7/1977 | Taylor | 523/126 |
| 4,041,209 | 8/1977 | Scholle | 428/500 |
| 4,042,763 | 8/1977 | Clampitt | 524/398 |
| 4,048,361 | 9/1977 | Valyi | 428/36.6 |
| 4,101,720 | 7/1978 | Taylor et al. | 523/126 |
| 4,127,503 | 11/1978 | Yoshikawa et al. | 252/429 |
| 4,133,802 | 1/1979 | Hatchiboshi et al. | 528/502 |
| 4,206,100 | 6/1980 | Kyo et al. | 524/413 |
| 4,237,034 | 12/1980 | Tomka | 524/398 |
| 4,377,652 | 3/1983 | Ohmura | 524/435 |
| 4,381,277 | 4/1983 | Nilsson | 264/512 |
| 4,384,972 | 5/1983 | Nakamura et al. | 252/188.21 |
| 4,447,583 | 5/1984 | Hocker et al. | 525/371 |
| 4,486,507 | 12/1984 | Schumacher | 428/476.1 |
| 4,501,781 | 2/1985 | Kushida et al. | 215/12.2 |
| 4,551,368 | 11/1985 | Smith et al. | 428/35 |
| 4,559,372 | 12/1985 | Giroud-Abel | 524/392 |
| 4,604,257 | 8/1986 | Smith et al. | 264/513 |

(List continued on next page.)

FOREIGN PATENT DOCUMENTS

| 0 065 278 | 5/1982 | European Pat. Off. . |
|---|---|---|
| 0083826 | 7/1983 | European Pat. Off. . |
| 0 176 446 A2 | 4/1986 | European Pat. Off. . |
| 0 268 848 A2 | 6/1988 | European Pat. Off. . |
| 0 269 066 A1 | 6/1988 | European Pat. Off. . |
| 0 288 972 | 11/1988 | European Pat. Off. ........ B32B 27/34 |
| 0 433 097 | 6/1991 | European Pat. Off. ............. 524/413 |
| 0 510 591 | 10/1992 | European Pat. Off. ............. 524/398 |
| 1522109 | of 1968 | France . |
| 0 045 152 | 2/1992 | Japan .................... 524/398 |
| 1188170 | 4/1970 | United Kingdom . |
| 1 428 197 | 3/1976 | United Kingdom ......... C08G 69/26 |
| 1 545 096 | 5/1979 | United Kingdom . |
| 1 572 902 | 8/1980 | United Kingdom . |
| 1 582 296 | 1/1981 | United Kingdom . |
| 1 586 204 | 3/1981 | United Kingdom . |
| 2091629 | 8/1982 | United Kingdom . |
| 2 119 741 | 11/1983 | United Kingdom . |
| 2078171 | 5/1984 | United Kingdom . |
| 2 212 102 | 7/1989 | United Kingdom . |
| WO 88/09354 | 12/1988 | WIPO . |

OTHER PUBLICATIONS

H.F. Mark, "Encyclopedia of Polymer Science and Engineering," vol. 2, 1985, pp. 84–85, (p. 85, para. 3).

Michael L. Rooney, "*Oxygen Scavenging: A Novel Use Of Rubber Photo–Oxidation*", Chemistry and Industry, Mar. 20, 1982, pp. 197–198.

Michael L. Rooney, "*Oxygen Scavenging from Air in Package Headspaces by Singlet Oxygen Reactions in Polymer Media*", Journal of Food Science, vol. 47, (1981), pp. 291–294 and 298.

Michael L. Rooney and Robert V. Holland, "*Singlet Oxygen: An Intermediate in the Inhibition of Oxygen Permeation Through Polymer Films*", Chemistry and Industry, Dec. 15, 1979, pp. 900–901.

(List continued on next page.)

*Primary Examiner*—Peter A. Szekely
*Attorney, Agent, or Firm*—Burns, Doane, Swecker & Mathis, L.L.P.

[57] ABSTRACT

The present invention provides a wall for a package, which wall comprises, or includes a layer comprising, a composition comprising a polymer and capable of scavenging oxygen through the metal-catalyzed oxidation of an oxidizable organic component thereof. The oxidizable organic component is preferably itself a polymer, and may be the only polymer in the composition. Preferred compositions include a blend of 96% polyethylene terephthalate and 4% poly (m-xylyleneadipamide) containing 200 ppm cobalt as catalyst, with good permeance-versus-time performance (3) when formed into a bottle.

8 Claims, 3 Drawing Sheets

U.S. PATENT DOCUMENTS

| | | | |
|---|---|---|---|
| 4,618,386 | 10/1986 | Yatsu et al. | 156/242 |
| 4,662,904 | 5/1987 | Ryzin et al. | 55/158 |
| 4,727,106 | 2/1988 | Paul | 524/398 |
| 4,728,549 | 3/1988 | Shimizu et al. | 428/36.6 |
| 4,820,442 | 4/1989 | Motoyama et al. | 252/188.28 |
| 4,836,952 | 6/1989 | Nasu et al. | 252/188.28 |
| 4,877,664 | 10/1989 | Maeda et al. | 428/35.9 |
| 4,931,488 | 6/1990 | Chiquet | 523/126 |
| 4,939,194 | 7/1990 | Scott | 523/126 |
| 4,980,211 | 12/1990 | Kushida et al. | 428/36.7 |
| 5,021,515 | 6/1991 | Cochran et al. | 525/371 |
| 5,034,252 | 7/1991 | Nilsson et al. | 524/538 |
| 5,049,624 | 9/1991 | Adams et al. | 525/371 |
| 5,151,463 | 9/1992 | Hayafune et al. | 524/435 |
| 5,153,038 | 10/1992 | Koyama et al. | 252/188.28 |
| 5,159,005 | 10/1992 | Frandsen et al. | 524/413 |
| 5,194,478 | 3/1993 | Frandsen et al. | 252/188.28 |
| 5,202,052 | 4/1993 | Zenner et al. | 252/188.28 |
| 5,211,875 | 5/1993 | Speer et al. | 252/188.28 |
| 5,239,016 | 8/1993 | Cochran et al. | 525/371 |
| 5,246,753 | 9/1993 | Koyama et al. | 252/188.28 |
| 5,281,360 | 1/1994 | Hong et al. | 252/188.28 |
| 5,302,430 | 4/1994 | Ardèchir et al. | 252/188.28 |
| 5,310,497 | 5/1994 | Ve Speer et al. | 252/188.28 |
| 5,314,987 | 5/1994 | Kim et al. | 252/188.1 |
| 5,346,644 | 9/1994 | Speer et al. | 252/188.28 |
| 5,641,825 | 6/1997 | Bacskai et al. | 524/413 |

OTHER PUBLICATIONS

Dr. R. Gächter und Dr. H. Müller, "Stabilizers, Processing Aids, Plasticizers, Fillers, Reinforcements, Colorants for Thermoplastics", Plastics Additives Handbook, pp. 54–59 (Dr. R. Gächter und Dr. H. Müller, "Stabilisatoren, Hilfsstoffe, Weichmacher, Füllstoffe, Verstärkungsmittel", Taschenbuch der Kunststoff–Additive, 1979, pp. 52 and 53).

H.G. Jellinek, "Aspects of Degradation and Stabilization of Polymers", Elsevier, 1978, pp. 106–125.

Prof. G. Scott, "Atmospheric Oxidation and Antioxidants", Elsevier, 1965, pp. 88–92 and 333.

Scott, "Developments in Polymer Stabilization", vol. 8, Elsevier, 1987, pp. 62–63.

Dr. M. Jewess, "Longer Shelf–Life for Foods Using Oxygen Absorbers", European Packaging Newsletter and World Report, vol. 21, No. 7, Jul. 1988, pp. 1–5.

Michael Fisch, "Antioxidants", Modern Plastics Encyclopedia, 1985–1986, pp. 104, 106.

J. Comyn, Tables of Permeability Data, Elsevier, 1985, pp. 61 and 283.

"Barrier Polymers", Encyclopedia of Polymer Science, vol. 2, 1985, pp. 178–179.

Prof. Dr.–Ing. E.h. Dr. Richard Vieweg und Dr. Alfred Müller, "Polyamide", Kunststoff–Handbuch, Band VI, 1966, p. 238.

Encyclopedia of Polymer Science and Technology, "Plastics, Resins, Rubbers, Fibers", vol. 10, pp. 423 and 464.

Haruhiko Watanabe, "A New Super Gas Barrier Nylon for Packaging—MXD6", 1986, pp. 89–99.

PACKAGING

This application is a divisional of application Ser. No. 08/472,841, filed Jun. 7, 1995, now U.S. Pat. No. 5,639,815 which is a continuation of application Ser. No. 08/061,939, filed May 17, 1993 (now abandoned), which is a divisional of application Ser. No. 07/668,906, filed Mar. 13, 1991 (now abandoned), which is a divisional of application Ser. No. 07/340,416, filed Mar. 23, 1989 (now U.S. Pat. No. 5,021,515).

The present invention relates to packaging, especially packaging of oxygen-sensitive materials, most especially of foods and beverages.

Packaging, whether rigid, semi-rigid, flexible, lidded, or collapsible, or a combination of these, serves not merely to contain the material being packaged but, depending on the nature of the material, to prevent ingress of harmful substances from the environment. Oxygen from the atmosphere has long been regarded as one of the most harmful substances for many packaged materials, especially foodstuffs.

Packaging made exclusively of glass or metal can provide an extremely good barrier both to egress of all substances from the package (especially water and carbon dioxide) and to ingress of all substances from the environment. Packaging made of polymers in whole or in part generally performs far less well in both these respects. This has restricted for many years the use of polymers in packaging, despite the great advantages of polymers. These advantages derive from the diversity of polymers themselves in mechanical, thermal, and optical properties and from the diversity and adaptability of fabrication techniques for polymers, allowing flexible bags, rigid containers, and clinging films to be made, the package wall being homogeneous, laminated, or coated. Compared with glass and metal packages, polymer packages are generally light and compared with glass are generally less breakable. There are also cost advantages with some polymers.

Polyethylene terephthalate is a major packaging polymer, used particularly for bottles for carbonated beverages. It is over twenty times less permeable than polypropylene while still having a practically significant permeability. There are extremely impermeable polymers such as copolymers of ethylene and vinyl alcohol, of vinylidene chloride and vinyl chloride, and of m-xylylenediamine and adipic acid ("MXD6"); but for practical or cost reasons these tend to be used as thin layers on or between polyethylene terephthalate or (in the case of MXD6) for blending with polyethylene terephthalate, in low percent quantities, still leaving practically significant permeability. For instance, oriented blends of polyethylene terephthalate (96%) and MXD6 (4%) are about 70% as permeable as polyethylene terephthalate. Chemical Abstracts, 1984, volume 100, abstract 100: 193165x, being an abstract of Japanese published patent application 58 160344, gives some information on these blends.

We believe that there is considerable potential for extending the use of polymers by means of oxygen-scavenging systems. In these, oxygen reacts chemically as it is transmitted inwards towards the package contents. Accordingly, transmission of oxygen inwards to the package contents is reduced, not necessarily with any improvement in the performance of the package with respect to inward transmission of other substances such as nitrogen or water vapour or outward transmission of substances.

Among substances that we believe can then be more satisfactorily packaged with polymers we would particularly mention beers (especially lager beers), wines (especially white ones), fruit juices, some carbonated soft drinks, fruits, nuts, vegetables, meat products, baby foods, coffee, sauces, and dairy products. Almost all foods and beverages are likely to display some benefit.

Oxygen-scavenging implies consumption of a material incorporated in the wall of the package. This will be progressively consumed, so that the high barrier to oxygen must in principle be of limited duration. However, the deterioration of the barrier to oxygen is not necessarily commercially very significant. An advantage is obtained so long as the rate of such deterioration is not too great with respect to the time for which the deterioration can occur prior to consumption of the product. This will depend on the time from packaging to consumption and also on any relevant storage times of raw materials, fabricated packaging materials, and containers prior to their use in packaging the product. Good oxygen barrier performance over periods as short as one day might be in principle of use in certain cases, although periods of at least two, five, ten, twenty, fifty, or hundred days will extend the range of commercial applications. In respect of the prospective advantage from reducing barrier over short periods only, it should be remembered that oxygen entering the package shortly after the product is packaged has a longer time to react and therefore do damage than oxygen entering at a time nearer to consumption. It should also be remembered that in some cases oxygen will be packed with the product so that improvement of the performance of the package beyond a certain point may have a relatively insignificant effect on product quality.

An early proposal relating to oxygen-scavenging is described in U.S. Pat. No. 3,856,514 (published in 1971). This describes most particularly the addition of 0.8% to 2% by weight of antioxidants to hard polyvinyl chloride. Antioxidants exemplified are 2,2'-methylene-bis-(4-methyl-6-t-butylphenol) and 2,2'-dihydroxy-3,3'-dicyclohexyl-5,5'-dimethyldiphenylmethane. The best permeability value reported is twenty times lower than that of the polyvinyl chloride without the antioxidant. Experimental evidence on the duration of the effect is not given.

U.S. Pat. No. 4,048,361 (published in 1977) describes a multilayer structure in which a barrier layer such as an acrylonitrile-containing polymer, a terephthalate polyester, polyvinylidene chloride, a cellulosic material, or an elastomer is adhered to a layer comprising a carrier such as a polyolefin, polystyrene, and polyvinyl chloride and an antioxidant. No quantitative experimental investigation of the barrier properties is described. The use of antioxidants with polyethylene terephthalate is not specifically disclosed; in this respect it may be noted that antioxidants are not added to polyethylene terephthalate conventionally. (The conventional use of antioxidants is the suppression of oxidation of polymers, such oxidation in a package being regarded generally as undesirable.)

More recently, Rooney has described scavenging systems which operate by oxidation of organic materials such as 1,3-diphenylbenzofuran when illuminated in the presence of a dyestuff (Chem. Ind., 1979, 900–901; J. Food Science, 1981, 47, 291–298; Chem. Ind., 1982, 197–198). These systems have the disadvantage for use with, say, beer bottles that it is not practical to arrange for each bottle to be illuminated during storage.

As well as these proposals to use organic materials as scavengers there have been proposals to use inorganic reducing agents as follows: iron powder (Japanese published patent application 55 106519, published in 1980); hydrogen gas packed with the product (UK patent 1,188,170, published in 1970); and sulphites (UK patent specification 1,572,902, published 1980, and European published patent application 83 826 published 1983). There has been some commercial application of inorganic reducing agents. However, special packing procedures are of course necessary if hydrogen is used, and the use of sulphites and of iron requires special procedures for wall fabrication because of their poor compatibility with polymers.

Some discussion of the conventional measurements and units of oxygen permeation is appropriate at this point. The measurement is made by exposing a package wall of area A to a partial pressure p of oxygen on the one side and to an essentially zero partial pressure of oxygen on the other. The quantity of oxygen emerging on the latter side is measured and expressed as a volume rate dV/dt, the volume being converted to some standard conditions of temperature and pressure. After a certain time of exposure (usually a few days) dV/dt is generally found to stabilise, and a $P_W$ value is calculated from the equation (1).

$$dV/dt = P_W A p \qquad (1)$$

$P_W$ in the present specification and claims is called the permeance of the wall. (Analogy with magnetic permeance and electrical conductance would suggest that $P_W$ should be described as "permeance per unit area", but we are following the nomenclature in Encyclopaedia of Polymer Science and Technology, Vol.2, Wiley Interscience, 1985, page 178.) The standard conditions for expressing dV/dt used generally and in this specification are 0° C. and 1 atm (1 atm=101 325 N m$^{-2}$). If the thickness of the area of wall is substantially constant over the area A with value T and the wall is uniform through the thickness (i.e. the wall is not a laminated or coated one) then the permeability of the material in the direction normal to the wall if calculated from the equation (2).

$$dV/dt = P_M A p/T \qquad (2)$$

For non-scavenging materials, $P_W$ and $P_M$ are to a reasonable approximation independent of t and p, and $P_M$ of T although they are often appreciably dependent on other conditions of the measurement such as the humidity of the atmosphere on the oxygen-rich side and the temperature of the measurement.

For oxygen-scavenging walls, $P_W$ and $P_M$ are functions of t because the concentrations and activity of scavenger vary with time (particularly as the scavenger is consumed). This has not prevented us usually from measuring $P_W$ and $P_M$ reasonably accurately as a function of time (the changes in dV/dt being relatively gradual once the normal initial equilibration period of a few days is over). However, it should be recognised that, whereas after a few days' exposure to the measurement conditions a non-scavenging wall achieves a steady state in which dV/dt is equal to the rate of oxygen ingress to the wall, a scavenging wall achieves an (almost) steady state in which dV/dt is considerably less than the rate of oxygen ingress to the wall. This being the case, it is likely that $P_W$ calculated from (1) is a function of p as well as of t and that $P_M$ in (2) is a function of p and T as well as of t. $P_W$ and $P_M$ for scavenging walls are, strictly speaking, not true permeances and permeabilities at all (since permeation and scavenging are occurring simultaneously but, rather, apparent ones. However, we have chosen to retain the conventional terms "permeance" and "permeability". So long as the conditions of the measurement are sufficiently specified they are suitable for characterising the walls in a manner relevant to the packaging user (i.e. in terms of the oxygen emerging from the wall).

All values of $P_W$ and $P_M$ hereinafter in this specification (except where stated otherwise) are to be understood to refer to conditions in which p=0.21 atm, the relative humidity on the oxygen-rich side of the wall is 50%, the temperature is 23° C. and (in the case of $P_M$ values) the thickness of the wall is 0.3 mm. Conditions close to the first three of these, at least, are conventional in the packaging industry.

Further, as will be appreciated from the above discussion of the papers by Rooney, it is possible for $P_W$ and $P_M$ to be affected by the illumination of the wall under test. All $P_W$ and $P_M$ values hereinafter, and indeed all references to oxidation, oxidisability, and oxygen-scavenging properties, refer to the dark or else to conditions of irradiation not appreciably contributing to oxygen-scavenging.

The present invention provides a wall for a package, which wall comprises, or includes a layer comprising, a composition comprising a polymer and having oxygen-scavenging properties, characterised in that the composition scavenges oxygen through the metal-catalysed oxidation of an oxidisable organic component thereof.

It is important to note in respect of the above and the rest of the present specification and claims that the oxidisable organic component may be an oxidisable polymer. The use of an oxidisable polymer as the oxidisable organic component has the advantage, broadly speaking, over the use of an oxidisable non-polymeric component that it is less likely to affect adversely the properties of a non-oxidisable polymer with which it is blended. It is possible for an oxidisable polymer to be used as the sole polymer in the composition, serving a dual function as polymer and oxidisable organic component.

It is to be noted in the same respect that it is of course possible for two or more polymers, two or more oxidisable organic components, or two or more catalysts to be used. It is possible also for a metal catalyst to be used in combination with a non-metal catalyst. For instance, with some oxidisable organic components an organic peroxide may be used in combination with the metal catalyst.

By "wall for a package" in the present specification and claims is included (except where the context indicates otherwise) not only a wall when incorporated into a package structure but also packaging materials capable of forming walls, such as package bases, packaging sheet, and so on.

The word "catalyst" is used in the present specification and claims in a general way readily understood by the man skilled in the art, not necessarily to imply that it is not consumed at all in the oxidation. It is indeed possible that the catalyst may be converted cyclically from one state to another and back again as successive quantities of oxidisable component are consumed by successive quantities of oxygen. However, it may be that some is lost in side reactions, possibly contributing directly to oxygen-scavenging in small measure, or indeed that the "catalyst" is more properly described an an initiator (e.g. generating free radicals which through branching chain reactions lead to the scavenging of oxygen out of proportion to the quantity of "catalyst").

Advantageously, the permeance of the wall, for oxygen, is not more than 10.0 cm$^3$/(m$^2$ atm day), preferably not more than 5.0 cm$^3$/(m$^2$ atm day), more preferably not more than 2.0 cm$^3$/(m$^2$ atm day), especially not more than 0.5 cm$^3$/(m$^2$ atm day), and most especially not more than 0.1 cm$^3$/(m$^2$ atm day).

Advantageously, the permeance of the wall provided by the present invention is not more than three-quarters of that which it would have in the absence of oxygen-scavenging properties, preferably not more than one half, more preferably not more than one tenth, especially not more than one twenty-fifth, and most especially not more than one hundredth.

Such a permeance should advantageously be maintained for at least one day when the wall is exposed on both sides to air at 23° C. and 50% relative humidity, and more preferably for the longer periods referred to in the preliminary discussion above.

The necessary scavenging capacity of the wall will generally have to be greater the greater is the permeance in the absence of scavenging properties. Accordingly, a good effect even in relative terms is harder to achieve the higher is this latter permeance. Advantageously, therefore, the permeance in the absence of oxygen-scavenging properties is not more than 50 cm$^3$/(m$^2$ atm day), preferably not more than 30 cm$^3$/(m$^2$ atm day), most preferably not more than 18.0 cm$^3$/(m$^2$ atm day). A particularly good effect can be achieved where the said permeance is in the range from 1.5, preferably 3.0, to 30, preferably 18.0, cm$^3$/(m$^2$ atm day). While we believe that a good relative effect should be achievable when said permeances are lower than 1.5 cm$^3$/(m$^2$ atm day), the range of commercial applications seems to us to be relatively limited (generally because this would involve using in the wall major quantities of existing high barrier polymers rather than very convenient polymers such as polyethylene terephthalate).

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

The present invention provides in its second aspect a composition for packaging use which comprises a polymer, an oxidisable organic component, and a metal catalyst for the oxidation of the oxidisable organic component.

The composition provided by the present invention has three major uses.

Firstly, it can be used as the material for a wall (uniform in the direction normal to the wall at least) or else a layer of a wall providing the major part of the overall barrier. In such a case, the permeability of the composition for oxygen is advantageously not more than 3.0, preferably 1.7, more preferably 0.7, especially 0.2, and most especially 0.03 cm$^3$ mm/(m$^2$ atm day). The permeability of the composition provided by the present invention is advantageously not more than three-quarters of that in the absence of oxygen-scavenging properties, preferably not more than one half, more preferably not more than one-tenth, especially not more than one twenty-fifth, and most especially not more than one-hundredth. The permeability in the absence of oxygen-scavenging properties is advantageously not more than 17 cm$^3$ mm/(m$^2$ atm day), preferably 10, and most preferably 6. A particularly good effect can be achieved for such permeabilities in the range from 0.5, preferably 1.0, to 10, preferably 6.0, cm$^3$ mm/(m$^2$ atm day).

Secondly, the composition can be used as a master batch for blending with another polymer for such use.

Thirdly, it can be used for forming a layer of a wall which primarily provides oxygen-scavenging (another layer including polymer providing gas barrier without significant scavenging), or as a head-space scavenger (completely enclosed, together with the package contents, by a package wall).

The time period for which the permeability is maintained when the composition is stored in air, as granules or in another form, it is not necessarily critical since storage in sealed containers or under nitrogen is practical. However, preferably the permeability should be maintained in air for the periods referred to above in respect of the wall provided by the invention. More importantly, however, the permeability should preferably be maintained when a typical wall is made (0.3 mm thick).

In a third aspect, the invention provides a package, whether rigid, semi-rigid, collapsible, lidded, or flexible or a combination of these, a wall of which is a wall as provided by the present invention in its first aspect or comprises entirely, as a layer, or as a blend the composition provided by the invention in its second aspect.

Before we proceed to describe the present invention in more detail (including by means of Examples and an Experiment) it is appropriate to deal with the question of how one may determine permeance or permeability that a wall or composition would have in the absence of scavenging (this permeance or permeability being referred to several times above). The ratio of permeances or permeabilities in the presence and absence of scavenging are one (reciprocal) measure of the size of the scavenging effect, and it is for this reason that various upper limits on this ratio are suggested above. (Another measure might be the ratio of the quantities of oxygen emerging and entering the wall under test, but this is less practically convenient.) Four methods of determining the permeances or permeabilities in question will now be described with particular reference to determining whether a particular preferred ratio (3/4, 1/2, 1/10 etc. as described above) is exceeded:

(1) The wall under test is exposed to oxygen for a time sufficiently long that the oxygen permeance or permeability begins to rise as the oxidisable organic component is consumed. It is of course not necessary to continue the exposure until no further rise occurs (i.e. until the scavenging is totally absent). Whenever the exposure is terminated for a particular sample one can confidently set a lower limit on permeance or permeability in the absence of scavenging, and therefore an upper limit on the ratio in question.

(2) A wall is prepared for comparison free of catalyst, and the effect of the catalyst on pure permeation is estimated or (more likely) reasonably ignored. Some scavenging activity in the absence of catalyst will not preclude the establishment of the lower and upper limits referred to in (1).

(3) In some cases, as will be discussed in more detail later, the oxygen-scavenging property is still undeveloped until some time after the forming of a wall, in which case one may take the largest $P_W$ or $P_M$ value observed before achievement of maximum barrier as setting a lower limit on $P_W$ or $P_M$ in the absence of scavenging (results on unequilibrated samples being ignored, of course).

(4) In some cases, the oxygen-scavenging effect can be suppressed by cooling the wall or composition. With due allowance for the effect of changed temperature, the lower and upper limits referred to in (1) can be established.

Of the methods (1) to (4) above, (1) is probably the most general, although for very good materials the experimental time could be very long (e.g. exceeding one year) unless accelerating conditions were used (e.g. higher temperature, high partial pressures of oxygen). We believe that the walls and compositions in accordance with the present invention should all display a plot of permeance or permeability against time of exposure to oxygen essentially as shown in FIG. 1 attached hereto. However, it being relatively recently that this invention was made, we do not know the precise form of the whole curve. It should be noted that a similar curve for an inert gas such as nitrogen or carbon dioxide is not to be expected, nor is such a curve to be expected from known materials of high barrier properties although a long term increase of permeance or permeability both the oxygen and for nitrogen or carbon dioxide might occur as a result of general degradation.

This indicates a possible fifth method of test, namely performing comparative experiments with oxygen and an inert gas while making due allowance for the difference of gas based on broadly similar conventional materials. The validity of this method in principle we have confirmed by our finding that bottles made in accordance with the present invention provide an unexceptional barrier to loss of carbon dioxide from carbonated water contained in them.

The oxidisable component/metal catalyst combination to be used in accordance with the present invention in all its aspects may be selected by experimental trial and error such as the man skilled in the art may readily devise. A good preliminary screening can be achieved by means of pure scavenging measurements on granulates (see Example 7 for a possible procedure). A metal catalyst that is highly effective for one oxidisable organic component may be less effective for another. The effectiveness may depend on the precise grade of the organic component or of the polymer in the composition. It will depend on what fillers, conventional antioxidants, catalyst residues from polymerisation, pigments and dyes may be present or added.

We do not understand fully the role which the metal catalyst plays in the oxidation, although we regard metals with at least two positive oxidation states, especially transition metals, as the most promising catalysts when added in one of the positive oxidation states, particularly as cations. Thus cobalt added in the II and III state, rhodium added in the II state, and copper added in the II state have proved effective with some oxidisable organic components. Addition in the form of a carboxylate has proved convenient. Generally speaking, higher levels of catalyst achieve better scavenging. In the absence of undesired interactions between the catalyst and the other components (such as depolymerisation) a weight fraction of metal relative to the total composition of up to 5000 ppm can be readily contemplated. We have found that levels of at least 10, preferably 50, more preferably 100 ppm of metal can achieve catalysis (the precise level being determined by trial and error for a particular overall composition). In wall applications (as opposed to master batch applications where more catalyst is used) we have preferred to keep the level of metal below 300, more preferably 250 ppm.

In general, where the aim is to modify a non-oxidisable polymer so as to form a wall having scavenging properties the weight fraction of the oxidisable organic component is likely to lie in the range from 1 to 7 percent. However, where the oxidisable organic component is itself a polymer, then it may, depending on compatibility, be used in blends over a wide range of relative proportions with a non-oxidisable polymer or indeed be used as the sole polymer component of the composition (i.e. weight fractions from 1 to 100 percent). Higher weight fractions may be especially valuable with thin films and/or non-oxidisable polymers of relatively high permeability when high oxygen ingress rates are expected. Particularly interesting oxidisable polymers are the polyamides, especially those containing groups of the formula —arylene—$CH_2$—NH—CO—, conveniently in —NH—$CH_2$—arylene—$CH_2$—NH—CO—alkylene—CO— units. These polyamides are of especial interest with cobalt and rhodium catalysts. Especially suitable arylene groups are phenylene groups, particularly m-phenylene groups, which may be alkyl-substituted and/or condensed with other unsubstituted or alkyl-substituted aromatic rings. Alkylene and alkyl groups conveniently have from 1 to 10 carbon atoms and may be straight-chain or branched. Especially suitable alkylene groups are n-butylene groups. MXD6 is very suitable. Conveniently, the relative viscosity (also called viscosity ratio) of polyamides containing —NH—$CH_2$—arylene—$CH_2$—NH—CO—alkylene—CO— groups lies in the range from 1.5 to 4.5, especially 2.0 to 3.6 (measured for solutions in 95% aqueous sulphuric acid containing 1 g of polymer per 100 $cm^3$ solution).

Fully aliphatic polyamides are promising, comprising —CO($CH_2$)$_n$CONH($CH_2$)$_m$NH— or —($CH_2$)$_p$CONH— units (n, m, and p being integers usually 4, 5, or 6), although we have so far not achieved the very good results which we have achieved with MXD6. In general, the polyamide may include polymer linkages, side-chains, and end groups not related to the formal precursors of a simple polyamide (i.e. compounds having at least two amino groups per molecule together with those having at least two carboxylic acid groups per molecule, or aminocarboxylic acids). Conveniently, at least 90 mole percent of the polymer's formal precursors will be such. However, a polymer including a minority of amide linkages would in principle work, such a polymer perhaps being used as the sole polymeric component of the composition. Even in such a case, however, one would expect to include in the composition a concentration of —CONH— linkages similar to that which one would use with MXD6—i.e. concentrations of —CONH— in the total composition of at least 0.08 mmol/g, most commonly up to 0.6 mmol/g.

From a purely chemical standpoint, non-polymeric amides are attractive as oxidisable organic components. Non-polymeric compounds containing a group or groups of the formula —alkylene—CO—NH—$CH_2$—1,3-phenylene—$CH_2$—NH—CO—alkylene— are of interest, especially with cobalt and rhodium catalysts. The above comments on alkylene and 1,3-phenylene groups, made with reference to polymeric amides, apply here except that n-butylene is not so convenient if an alkylene group is terminated by H. An example of such a non-polymeric compound is n—$C_3H_7$—CO—NH—$CH_2$—m—$C_6H_4$—$CH_2$—NH—CO—n—$C_3H_7$, which in the presence of cobalt we have found to scavenge oxygen well, although its suitability for use in accordance with the present invention needs of course to be determined by trial and error in a particular application.

Other non-polymeric oxidisable compounds are also of interest, for instance conventional antioxidants including substituted phenols, especially 2,4,6-tri-(t-butyl)phenol.

Subject to the above preferences on physical properties, non-oxidisable polymers used according to the present invention in all its aspects can be chosen with fair freedom, unless there is some specific inhibition of the scavenging system or other untoward interaction. In principle, there may be a favourable interaction (e.g. if the non-oxidisable polymer contains as catalyst residues metals catalysing the oxidation of the oxidisable organic component); but in current commercial products the levels are usually low and the catalyst may be at least partially poisoned by the other residues or additives.

Polymers (formally) of one or more phthalic acids with one or more organic compounds containing at least two alcoholic hydroxy groups per molecule can offer fair impermeability in the absence of scavenging. Preferably, the permeabilities should be less than 6.0 $cm^3$ mm/($m^2$ atm day). Phthalic acid polyesters based on terephthalic or isophthalic acid are commercially available and convenient; the hydroxy compounds are typically ethylene glycol (which may yield diethylene glycol units in situ), and 1,4-di-(hydroxymethyl)-cyclohexane. Conveniently, the intrinsic viscosity (also called limiting viscosity number) for a phthalic acid polyester lies in the range from 0.6 to 1.2, especially 0.7 to 1.0 (for o-chlorophenol solvent). 0.6 corresponds approximately to a viscosity average molecular weight of 59 000, and 1.2 to 112 000.

In general, the phthalate polyester may include polymer linkages, side chains, and end groups not related to the formal precursors of a simple phthalate polyester previously specified. Conveniently, at least 90 mole percent will be terephthalic acid and at least 45 mole percent an aliphatic glycol or glycols, especially ethylene glycol.

Polyolefins blended with a scavenging system have been found to work, and by lamination or coating with less permeable material walls of interesting overall barrier properties should be achievable.

The composition may, as previously mentioned, include other components such as pigments, fillers, and dyestuffs. Usually, the total quantity of such components will be less than 10%, more usually less than 5%, by weight relative to the whole composition.

Compositions which we think may be of especial importance on the basis of our experiments to date include the following (the percentages being the weight fractions relative to the total composition):

compositions comprising at least 90%, preferably 95%, of polyethylene terephthalate and/or a polyamide taken together and having a permeability to oxygen of not more than 0.01 $cm^3$ mm/($m^2$ atm day);

compositions containing at least 90% of polyethylene terephthalate, preferably 95%, and having a permeability to oxygen of not more than 0.3 $cm^3$ mm/$m^2$ atm day), and preferably not more than 0.1 $cm^3$ mm/($m^2$ atm day), and more preferably not more than 0.03 $cm^3$ mm/($m^2$ atm day), preferably at least 0.5%, more preferably 1%, and also preferably less than 7% of the composition consisting of a polyamide; and compositions comprising at least 90%, preferably 95% of a polyamide and having a permeability to oxygen of not more than 0.01 $cm^3$ mm/($m^2$ atm day).

The composition provided by the present invention or used in walls provided by the present invention is preferably formed by mixing the metal catalyst with the other component or components of the composition all together or in any sequence. The metal catalyst is preferably added in the form of a solution or slurry. Conveniently, the mixing includes or is followed by melt-blending at a temperature appropriate to the components, commonly in the range from 100° C. to 300° C. The blending may immediately precede the formation of the finished article or a preform or parison, or may be followed by formation of feedstock for later use in the production of the finished article. We have found additions of catalyst in the range of 10 to 250, especially 50 to 200, ppm to be convenient.

The oxidation catalyst may be added to the monomers from which one or more polymeric components of a composition are made, rather than being added as proposed above in a subsequent blending step. Clearly, if the oxidation catalyst neither interferes with nor is affected by the polymerisation process then this may be an attractive option. If the catalyst interferes or assists with the polymerisation or is at least partially poisoned by the usual steps in the polymerisation (as may be the case with cobalt and polyethylene terephthalate production), then modification or careful selection of polymerisation protocols will be necessary.

In some systems at least, the scavenging properties do not emerge immediately after the blending, but only after ageing. This may be because catalyst species have to migrate to relevant sites in the composition because it is incorporated so as to be present in the "wrong" phase or because the relevant sites in the oxidisable component to which they were attached during processing were very largely oxidised during processing, or because a slow initiation is involved, or for some other reason. Prolonged ageing at ordinary temperatures, or ageing accelerated by elevated temperatures, are in principle possible but are costly. However, the higher the level of catalyst used, generally the less ageing is required. Indeed, we have achieved very high barrier to oxygen so soon after fabrication of walls that any delay is comparable with or shorter than the normal time required to equilibrate the wall on the OXTRAN machine, and is unlikely to impose significant cost penalties. In general, one would seek to achieve high barrier within 30 days, preferably 20 days, and more preferably 10 days, of the wall being fabricated if the wall is stored at 23° C. and 50% relative humidity.

We shall now consider briefly the packaging structures and forming techniques that will be appropriate when the present invention is used for packaging. Where the oxidisable organic component is non-polymeric it may have a significant effect on the forming techniques used, especially on the temperatures that may be used if the component is volatile. This in turn will affect the structures that can readily be made. Where, however, the composition used comprises oxidisable polymer plus catalyst, or non-oxidisable polymer, oxidisable polymer, plus catalyst, then the forming techniques and structures can be expected to match those appropriate to the oxidisable polymer or its blend in the absence of catalyst; the quantities of catalyst used are likely to be too small to have much effect on mechanical properties in most cases.

Among the techniques that may be in question are moulding generally, injection moulding, stretch blow moulding, extrusion, thermoforming, extrusion blow moulding, and (specifically for multilayer structures) co-extrusion and lamination using adhesive tie layers. Orientation, e.g. by stretch blow moulding, of the polymer is especially attractive with phthalate polyesters and their blends with MXD6 because of the known mechanical and (in the latter case) barrier advantages that result.

In the discussion of wall structures according to the invention early in this specification, the design considerations relating to the barrier properties were referred to. However, there are more general considerations, familiar in the art, which will be taken into account in practical applications.

One such consideration is rigidity. If a plastic container is to be self-supporting when empty, then the thickness of the wall is likely to lie in the range from 200 to 500 micrometer; such containers are often referred to as "semi-rigid". More flexible packaging structures such as meat packs are likely to have wall thickness in the range from 20 to 200 micrometer. Where thick structures are required, one may choose to provide only a thin highly effective scavenging barrier layer supported by mechanically superior or cheaper relatively poor barriers.

Another consideration is the requirements for bonding of the wall made in accordance with the present invention. For instance, an extra layer may be added to a sheet so as to permit heat sealing to complete a package structure.

A further consideration is the protection of the oxygen-scavenging composition from the package contents of the environment if direct contact causes any difficulties (e.g. undesirable chemical reactions or leaching). In such a case a protective layer will be provided on the appropriate side of the layer containing the oxygen-scavenging composition.

For the avoidance of any possible doubt resulting from the two sets of design considerations for multilayer structures, three such structures for walls according to the present invention will now be described, by way of illustration only, by reference to the FIGS. 3 to 5, each representing schematic sections (not to scale) of multilayer walls according to the invention.

Figure 3:
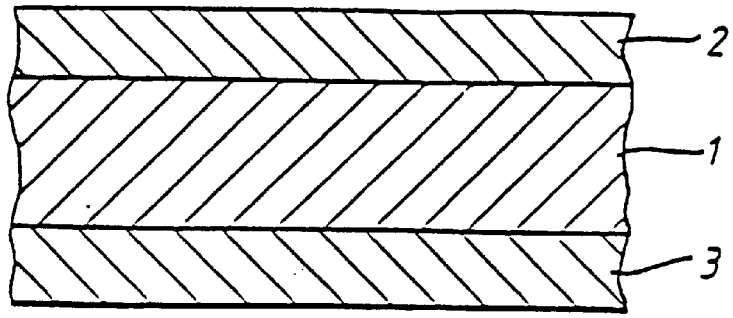

In FIG. 3, layer 1 consists of a blend of a first polymer, an oxidisable organic component, and a metal catalyst. Layers 2 and 3 consist of a second polymer having a permeability much less than the permeability of the pure first polymer. The overall permeance performance of the wall is markedly superior to that of a single-layer wall of the same composition as layers 2 and 3 or of a single-layer wall of the same composition as layer 1.

Figure 4:
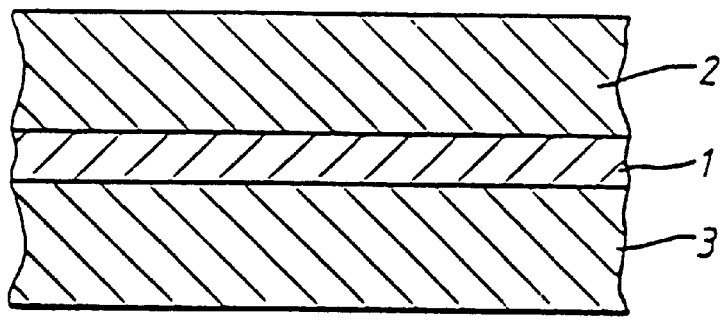

In FIG. 4, layer 1 consists of an oxidisable polymer and a metal catalyst and alone would have a low permeance. Layer 1 is too thin for the proposed use and is supported by layers 2 and 3 of a non-oxidisable polymer which do not significantly reduce the permeance.

Figure 5:
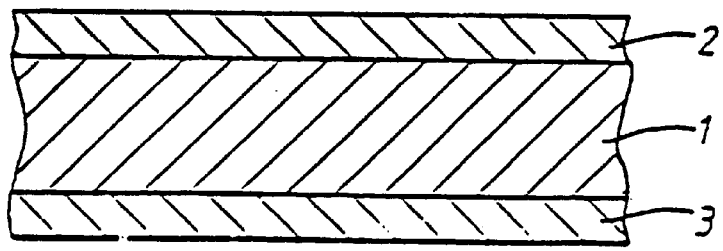

In FIG. 5, layer 1 consists of a blend of a first polymer, and oxidisable organic component, and a metal catalyst. Its permeance is low and it could be economically used at a thickness appropriate to the proposed use. However, layer 1 is protected from undesired direct interaction with the package contents and the environment by layers 2 and 3 of a second polymer which do not significantly reduce the permeance.

The present invention will now be further described, by way of illustration only, by means of the following Examples and an Experiment.

EXAMPLES 1 TO 5

The materials used in these Examples were of the grades specified below. Further information was obtained by our own measurements or from the manufacturers' literature.
Polyethylene terephthalate, grade B90N, from ICI of UK This is a polymer of ethylene glycol with terephthalic acid. It was found to contain 35 ppm cobalt, 25 ppm sodium, 38 ppm phosphorus, and 32 ppm antimony, with $\leq 1$ ppm of copper, germanium, iron, manganese, and titanium. The intrinsic viscosity in o-chlorophenol is 0.82.
MXD6, grade Renv 6001, from Mitsubishi Gas Chemicals of Japan This is a polymer of meta-rylylenediamine $H_2NCH_2$—m—$C_6H_4$—$CH_2NH_2$ with adipic acid $HO_2C(CH_2)_4CO_2H$. The relative viscosity of the polyamide is 2.1, for a solution in 95% aqueous sulphuric acid containing 1 g of polymer per 100 cm$^3$ of solution.
Cobalt Siccatol, from Akzo Chemie ("Siccatol" is a trade mark)

This is a solution in white spirit of $C_8$–$C_{10}$ cobalt carboxylates. The concentration of cobalt (as metal) is 10% by weight relative to the solution.

Granules of the polyethylene terephthalate and of the MXD6 were mixed by hand in a tray together with the Siccatol solution in the relevant proportions. The mixture was then heated at 100° C. for 18 hours in a recirculating dehumidified air dryer (this to remove water from the two polymers so as to avoid degradation in injection moulding, as well as incidentally driving off unevaporated white spirit).

The mixture was then used to make a preform for a one-liter cylindrical bottle. The injection moulding was performed on a Krauss Maffei KM 150 machine. The mass of the preform was approximately 33 g. The preform was then reheated and blown to form the bottle with biaxial orientation (i.e. circumferential and longitudinal orientation). For this, a Corpoplast BMB3 stretch blow moulding machine was used. The bottle had a wall thickness of 0.3 mm.

Five bottles were made and tested for oxygen permeance on an OXTRAN machine 10/50 A made by Mocon Inc of USA. The conditions of the tests were as set out earlier in this specification.

Tests were performed at various times after the bottle had been manufactured. In between tests, the bottles were stored with air both inside and out. Each test lasts 3 to 4 days until the bottle (as is usual) "equilibrates" from its storage conditions (exposed to the atmosphere inside and out) to the test conditions.

The various compositions and the test results obtained are set out in Tables 1 and 2. The permeances per unit area quoted are calculated from the OXTRAN result on the basis of an oxygen partial pressure of 0.21 atm and a bottle area of 0.0575 m$^2$. $P_W$=O indicates that no oxygen transmission was detected. The bottle wall being essentially uniform, they may be converted into permeabilities in cm$^3$ mm/(m$^2$ atm day) for the material by multiplying them by 0.3.

For comparison, in Table 2, are also listed the $P_W$ values observed (or calculated from reported $P_M$ values) for similar bottles made from the same polymer components in which the oxygen-scavenging effect is absent (no addition of cobalt). These figures are approximate, but the spectacular character of the effect is immediately evident from the comparison.

Figure 2:
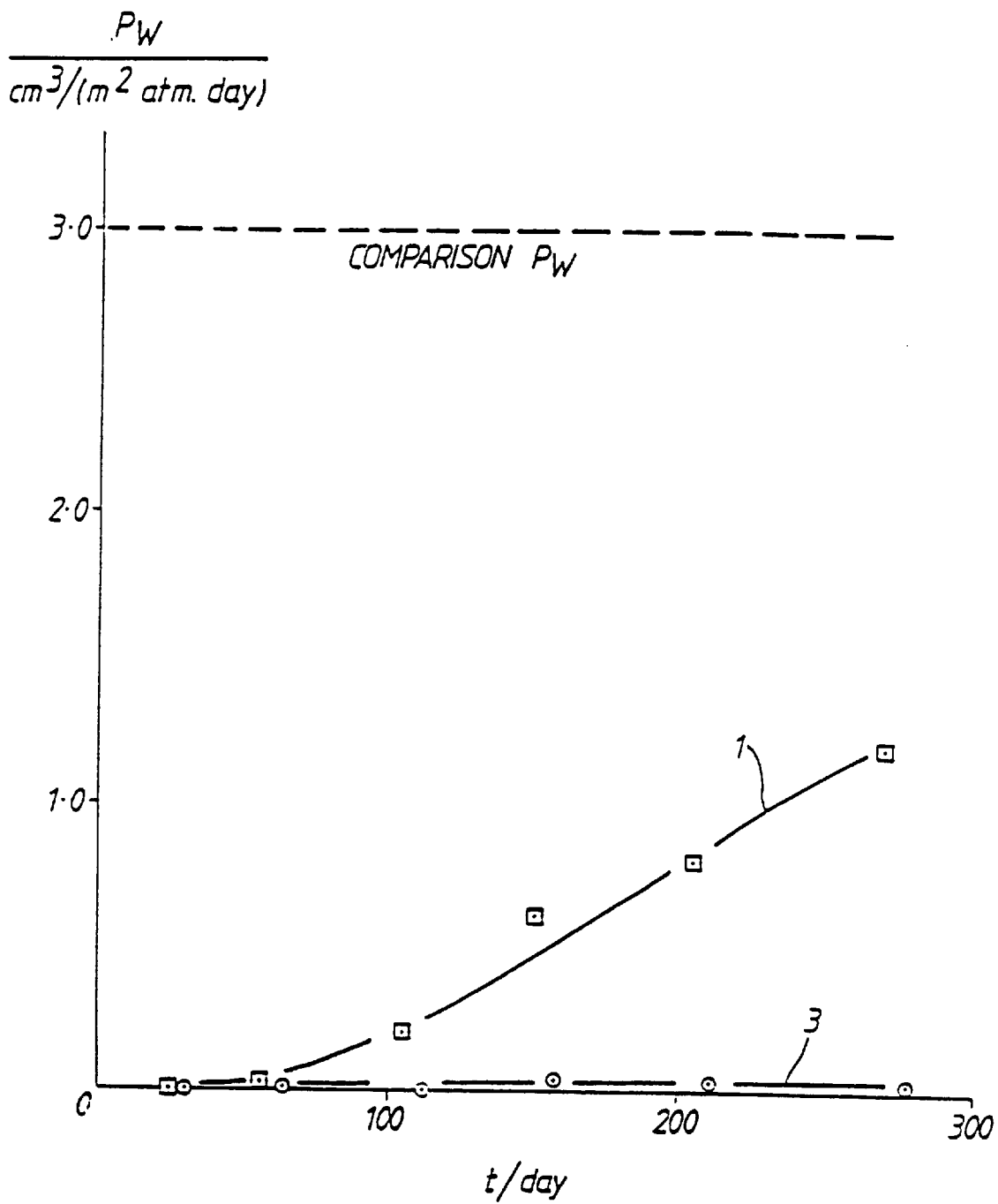

The results of Examples 1 and 3 are plotted in FIG. 2.

A rough calculation for Example 3 based on the comparison $P_W$ figure indicates that at the time of the last measurement the bottle will have scavenged at least 0.9 mmol of $O_2$. The bottle contains only 0.11 mmol of Co, establishing that the cobalt functions as a catalyst in the sense previously described.

The Examples show that, notwithstanding some variability between samples of similar composition, there is a broad positive correlation between the extent and duration of scavenging and the levels of both the oxidisable organic component and the catalyst.

TABLE 1

WEIGHT FRACTIONS OF RAW MATERIALS USED RELATIVE TO TOTAL BALANCE POLYETHYLENE TEREPHTHALATE

| EXAMPLE No. | WEIGHT FRACTION MXD6 | WEIGHT FRACTION COBALT AS METAL | STORAGE CONDITIONS | TIME IN DAYS FROM MANUFACTURE OF FIRST MEASUREMENT $P_W = 0$ |
|---|---|---|---|---|
| 1 | 4% | 50 ppm | 23° C. 50% R.H. | 10 |
| 2 | 4% | 50 ppm | Uncontrolled storage cooler than 1 | 3 |
| 3 | 4% | 200 ppm | as 1 | 3 |
| 4 | 2% | 50 ppm | as 2 | 10 |
| 5 | 1% | 50 ppm | as 2 | 20 |

TABLE 2

This table gives $P_W$ at time t after first measurement of $P_W = 0$ and a comparison $P_W$ (no scavenging) for Examples 1 to 5.

EXAMPLE 1 test results

| t in day | 0 | 24 | 57 | 105 | 150 | 203 | 270 |
|---|---|---|---|---|---|---|---|
| $P_W$ in cm$^3$/(m$^2$atmday) | 0 | 0 | 0.016 | 0.19 | 0.6 | 0.8 | 1.2 |

Comparison $P_W = 3.0$ cm$^3$/(m$^2$ atm day)

EXAMPLE 2 test results

| t in day | 0 | 135 | 192 | 207 |
|---|---|---|---|---|
| $P_W$ in cm$^3$/(m$^2$atmday) | 0 | 0.025 | 0.3 | 0.35 |

Comparison $P_W = 3.0$ cm$^3$/(m$^2$ atm day)

EXAMPLE 3 test results

| t in day | 0 | 31 | 64 | 112 | 157 | 210 | 277 |
|---|---|---|---|---|---|---|---|
| $P_W$ in cm$^3$/(m$^2$atmday) | 0 | 0 | 0.009 | 0 | 0.03 | 0.02 | 0.02 |

Comparison $P_W = 3.0$ cm$^3$/(m$^2$ atm day)

EXAMPLE 4 test results

| t in day | 0 | 125 | 185 | 200 |
|---|---|---|---|---|
| $P_W$ in cm$^3$/(m$^2$atmday) | 0 | 0.95 | 1.3 | 1.4 |

Comparison $P_W = 3.8$ cm$^3$/(m$^2$ atm day)

EXAMPLE 5 test results

| t in day | 0 | 115 | 175 | 195 |
|---|---|---|---|---|
| $P_W$ in cm$^3$/(m$^2$atmday) | 0 | 2.7 | 3.1 | 3.3 |

Comparison $P_W = 4.2$ cm$^3$/(m$^2$ atm day)

EXAMPLE 6

This Example illustrates the use of a master batch.

MXD6 and Cobalt Siccatol were mixed and injection moulded into preforms. 2000 ppm cobalt as metal was used by weight relative to the MXD6.

The preform was then granulated to make a master batch of granules. These were then mixed with polyethylene terephthalate to make further preforms, and these were blown into bottles the same day. 6% by weight of master batch and 94% by weight of polyethylene terephthalate were used.

The procedures were as described in Examples 1 to 6 save that, of course, polyethylene terephthalate was omitted in the first stage of the above procedure and Cobalt Siccatol in the second.

The bottles achieved a $P_W$ of 0.002 cm$^3$/(m$^2$ atm day) within 2 days.

EXAMPLE 7

This Example directly illustrates the scavenging properties of compositions in accordance with the invention, and the dependence of the properties on temperature.

A preform was made as described in Examples 1 to 5 with the same ingredients, but the weight fractions of MXD6 and cobalt (on the same basis) were 2% and 100 ppm respectively.

The preform was granulated and 25 g samples were sealed into each of three 60 cm$^3$ vials having a septum through which the head space gas could be sampled. The three vials (1 to 3 below) were stored at different temperatures for 38 days and the head space gas was analysed. For comparison similar samples without the added cobalt were stored under similar conditions (vials C1 to C3 below) and the head space gas analysed. The results are summarised in the following table. The $O_2:N_2$ ratios are more reliably determined than the absolute values (themselves normalised so as to sum to 99%).

| Vial No. | Storage temperature in ° C. | Volume fraction of $O_2$ after 38 days | Volume fraction of $N_2$ after 38 days |
|---|---|---|---|
| 1 | 4° C. | 12 | 87 |
| C1 | 4° C. | 20 | 79 |
| 2 | 20° C. | 8 | 91 |
| C2 | 20° C. | 20 | 79 |
| 3 | 55° C. | 5 | 94 |
| C3 | 55° C. | 20 | 79 |

It will be seen that although the scavenging effect is reduced at 4° C., it is still very appreciable, which is of course relevant to packaging applications where prolonged refrigerated or other cool storage may occur.

A rough calculation for test vial 2 indicates that the amount of $O_2$ scavenged over 38 days was 0.24 mmol, whereas the amount of the sample contained only 0.04 mmol Co, establishing again that the cobalt functions as a catalyst in the sense previously described.

EXAMPLE 8

This Example illustrates the present invention under test conditions, more closely approaching the actual (aqueous) conditions in beverage applications. A nominal one-liter bottle was made as described for Examples 1 to 5, and with the same composition as the bottle of Example 3.

The bottle had a volume of 1040 $cm^3$ and was filled with 1000 $cm^3$ of water through which nitrogen gas was bubbled before the bottle was finally sealed with a septum permitting head space sampling.

The volume fraction of oxygen in the head space gas was monitored as a function of time, the bottle being stored in ambient laboratory conditions.

The volume fraction was less than 0.2% after 31 days, a very similar result being obtained with a glass bottle comparison. A comparison bottle without the added cobalt gave a result of 1.1%.

The bottles were then subjected to a variety of temperature conditions (a period at 38° C., 4° C., and ambient) and after 108 days the results for the example, the glass comparison, and the comparison without added cobalt were 0.2%, 0.2%, and 2.7%.

EXAMPLE 9

This Example illustrates the use of a rhodium catalyst instead of a cobalt catalyst in a system otherwise similar to those of Examples 1 to 8.

Polyethylene terephthalate, MXD6, and a solution of rhodium (II) acetate dimer were mixed and dried overnight at 100° C. The first two components were of the grades used in Examples 1 to 5. The weight fractions of MXD6 and of rhodium (as metal) relative to the whole mixture were 4% and 175 ppm respectively.

A preform for a 296 $cm^3$ bottle was made on a Meiki 200 injection moulding machine, and the bottle was blown. Limit-of-detection oxygen transmission was observed on the OXTRAN machine previously referred to.

EXAMPLE 10

This Example illustrates the present invention applied to a polymer other than polyethylene terephthalate. It also demonstrates the scavenging in an injection-moulded (unblown) container.

Polypropylene (Solvay grade KL 104) straight from the bag was mixed with MXD6 of the grade used in Examples 1 to 5 which had been previously dried overnight at 100° C. in a dehumidifying air dryer and with cobalt Siccatol. Without further drying, the mixture was injection-moulded to form a cylindrical pot on a Meiki 200 injection moulding machine. The pot had a wall thickness of 1.5 mm, was 61 mm diameter, 70 mm high, and had a surface area of 0.015 $m^2$ The weight fractions of MXD6 and cobalt (as metal) relative to the whole composition were respectively 10% and 200 ppm. Permeances on the OXTRAN machine of less than 16 $cm^3/(m^2$ atm day) were observed over 18 days of testing. A comparison without added cobalt had a permeance of 26 $cm^3/(m^2$ atm day).

This performance indicates a very high rate of scavenging and implies that the composition may be useful for head space scavenging or as the scavenging layer in a wall including additionally a non-scavenging layer of low permeability.

EXAMPLE 11

This Example illustrates the use of a different scavenging system once more with polypropylene in place of polyethylene terephthalate.

Example 10 was repeated but instead of MXD6, nylon-6,6 of ICI grade A100 pre-dried as supplied was used. Instead of Cobalt Siccatol, a solution of copper (II) acetate in methanol was used (7 $g/dm^3$ concentration). The weight fractions of nylon-6,6 and copper (as metal) relative to the total composition were 20% and 25 ppm respectively, the balance being polypropylene.

Pink-coloured bottles were produced which had a permeance of approximately 6 $cm^3/(m^2$ atm day) for 22 days of testing in the OXTRAN machine. A comparison bottle without added copper had a permeance of 9 $cm^3/(m^2$ atm day).

EXAMPLE 12

This Example illustrates another scavenging system with another non-oxidisable polymer. The metal catalyst in this case is assisted by an non-metallic catalyst, and the oxidisable organic component is non-polymeric.

The procedure of Example 10 was repeated, but on this occasion with low density polyethylene instead of polypropylene, and 2,4,6-tri-(t-butyl)phenol and 2,5-dimethylhexane-2,5-di-(-t-butyl) peroxide instead of MXD6. The polyethylene was DSM grade Stanylan LD 2308A; the substituted phenol was the material of Aldrich Chemical Co. Ltd; and the peroxide was the material of Interox Chemicals Ltd.

The weight fractions relative to the total composition were 4% substituted phenol, 1% peroxide, 100 ppm cobalt (as metal), and balance low density polyethylene.

The permeance was consistently measured as 30–33 $cm^3/(m^2$ atm day) over a period of 8 days, whereas a comparison without the added cobalt had values rising monotonically from its lowest value of 46 $cm^3/(m^2$ atm day) to 66 $cm^3/(m^2$ atm day) over the same period.

EXAMPLES 13 TO 20

It is believed that the foregoing examples provide ample instruction to the man skilled in the art to put the present invention into effect, but for the sake of completeness there are listed in Table 3 various other compositions we have found to perform well (permeances less than 0.05 $cm^3/(m^2$ atm day). The permeances were measured on 0.3 mm walls except in the case of Example 18, where the wall was 1.5 mm thick.

TABLE 3

| Example No. | Polymer (balance or composition) | Oxidisable organic component and weight fraction | Catalyst and weight fraction |
| --- | --- | --- | --- |
| 13 | PET | MXD6 4% | Co 100 ppm added as Co (II) acetylacetonate |
| 14 | PET | MXD6 | Co 100 ppm |

TABLE 3-continued

| Example No. | Polymer (balance or composition) | Oxidisable organic component and weight fraction | Catalyst and weight fraction |
|---|---|---|---|
| | | 4% | added as Co (III) acetylacetonate |
| 15 | PET | MXD6 4% | Co 100 ppm added as Co (II) stearate |
| 16 | PET | MXD6 4% | Co 100 ppm added as Durham Chemicals Nuosyn |
| 17 | PET | MXD6 4% | Co 100 ppm added as Co (II) neodecanoate |
| 18 | PETG | MXD6 5% | Co 200 ppm added as Cobalt Siccatol |
| 19 | P121 | MXD6 5% | Co 100 ppm added as Cobalt Siccatol |
| 20 | — | MXD6 100% | Co 200 ppm added as Cobalt Siccatol |

Notes to Table 3:-
PET, MXD6: grades as in Examples 1 to 5.
PETG: a modified PET including 1,4-di-(hydroxymethyl)-cyclohexane units, Eastman Kodak grade 6763.
P121: another ICI grade of polyethylene terephthalate suitable in this admixture with MXD6 for extrusion. intrinsic viscosity in o-chlorophenol 0.85.

EXPERIMENT

Fibres of a material having the same composition as the master batch in Example 6 were formed into a film and the infra-red absorption spectrum was observed. An absorption was observed at 1640 cm$^{-1}$ which we believe represents an amide carbonyl absorption.

The material was then held in air in an oven at 55° C. for two months and the spectrum was once more observed. A new albeit relatively small peak was observed at 1740 cm$^{-1}$ which we believe represents a carbonyl absorption distinct from the amide carbonyl absorption at 1640 cm$^{-1}$ (still present).

The same effect was observed after holding fibres at 100° C. in air for only 5 days.

No such effect was observed when MXD6 fibres without cobalt was held in air at 100° C. for 5 days.

We believe that the new band may indicate a carbonyl group formed when the material scavenges oxygen, or possibly the carbonyl group in the original material whose chemical environment has been changed by oxidation.

We claim:

1. A wall for a package which comprises:

(a) a base polymer which includes an oxidizable organic polymer component which scavenges oxygen, and (b) a transition metal in a positive oxidation state, wherein the oxidizable organic polymer component, the transition metal and the respective amounts thereof are selected so that the wall will scavenge oxygen during a period of oxygen scavenging to such an extent that the permeance of the wall for oxygen is not more than 0.5 cm$^3$/(m$^2$ atm day), the period of oxygen scavenging is maintainable for at least 20 days at 23° C. and 50% relative humidity and the permeance of the wall for oxygen during said period of oxygen scavenging is not more than three-quarters of that which it would have had in the absence of oxygen scavenging.

2. The wall according to claim 1, wherein said wall is in the form of a rigid container which is self-supporting when empty.

3. A wall according to claim 1, wherein the period during which the permeance of the wall for oxygen is not more than 0.1 cm$^3$/(m$^2$ atm day) is at least 20 days.

4. A wall according to claim 1, wherein the period during which the permeance of the wall for oxygen is not more than 0.5 cm$^3$/(m$^2$ atm day) is at least 100 days.

5. A wall according to claim 1, wherein the permeance of the wall for oxygen during said period is not more than one-half of what it would have been in the absence of oxygen-scavenging.

6. A wall according to claim 1, wherein the permeance of the wall for oxygen during said period is not more than one-tenth of what it would have had in the absence of oxygen-scavenging.

7. A wall according to claim 1, wherein the permeance of the wall for oxygen falls to three-quarters of what it would have been in the absence of oxygen scavenging within 30 days of the wall being fabricated.

8. A wall according to claim 1, wherein the wall has a permeance for oxygen of not more than 50 cm$^3$/(m$^2$ atm day) in the absence of oxygen scavenging.

* * * * *